United States Patent [19]

Printy et al.

[11] 3,751,246

[45] Aug. 7, 1973

[54] PHOTOCONDUCTIVE ELEMENTS EMPLOYING N-VINYL CARBAZOLES HAVING FUSED CONDENSED ARENIC RING STRUCTURES

[75] Inventors: Helen C. Printy, Cleveland; Evan S. Baltazzi, Northfield, both of Ohio

[73] Assignee: Addressograph-Multigraph Corporation, Cleveland, Ohio

[22] Filed: Sept. 7, 1971

[21] Appl. No.: 178,368

Related U.S. Application Data

[63] Continuation-in-part of Ser. No. 698,420, Jan. 17, 1968, abandoned.

[52] U.S. Cl. ........................ 96/1.5, 96/1.6, 117/201, 252/501

[51] Int. Cl. ........................ G03g 5/06

[58] Field of Search ..................... 96/1, 1.5; 252/501

[56] References Cited

UNITED STATES PATENTS

| | | | |
|---|---|---|---|
| 3,037,861 | 6/1962 | Hoegl | 96/1.5 |
| 3,037,940 | 6/1962 | Hoegl | 96/1.5 |

*Primary Examiner*—Charles E. Van Horn
*Assistant Examiner*—M. B. Wittenberg
*Attorney*—Sol L. Goldstein

[57] ABSTRACT

Organic photoconductive materials which are N-vinyl carbazoles having fused condensed arenic ring structures having the following general formula:

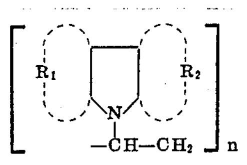

in which $R_1$ and $R_2$ are fused condensed arenic ring structures having from four to 12 carbon atoms and *n* is an integer greater than 1. The material may be used in the monomeric form dispersed in a resin binder and applied to a base support or polymerized forming a photoconductive film when applied to a suitable support.

19 Claims, No Drawings

PHOTOCONDUCTIVE ELEMENTS EMPLOYING N-VINYL CARBAZOLES HAVING FUSED CONDENSED ARENIC RING STRUCTURES

CROSS REFERENCE TO RELATED APPLICATIONS

This application is a Continuation-in-Part application of Ser. No. 698,420, filed on Jan. 17, 1968 now abandoned, in the name of Helen C. Printy and Evan S. Baltazzi.

BACKGROUND OF THE INVENTION

This invention relates to polymeric polynuclear heterocyclic aromatic compounds and more particularly to photoconductive members formulated from the film forming polymeric polynuclear heterocyclic aromatic compounds.

Photoelectrostatic imaging processes involve a photoconductive medium which is charged in the dark, exposed to a pattern of light and shadow producing a charge pattern corresponding to the image portions of the original desired to be reproduced. This image is then developed by applying an electrostatically attractable powder generally known in this art as toner.

The photoconductive medium usually comprises a conductive support to which has been applied a photoconductive layer or film, such as selenium, zinc oxide or an organic containing material, such as anthracene. In the case of zinc oxide, which is an inorganic photoconductive crystalline material, the photoconductor is dispersed in a resin binder. Organic photoconductive materials of the donor type may be polymeric in nature and in themselves form a uniform continuous photoconductive film. In other instances, the organic photoconductive compounds may be dispersed in an organic resin binder and applied to a conductive support in order to form a photoconductive member.

In the formation of the photoconductive materials, irrespective of whether they involve elemental selenium as the active photoconductive material, or an inorganic pigment such as zinc oxide, or organic photoconductive materials, it has been found necessary to sensitize these photoconductors so as to extend the spectral range of electromagnetic radiation to which they can respond. When dealing with organic photoconductors, it was well known to add $\pi$ acid-type sensitizers to extend the spectral response range.

The $\pi$ acids are electron acceptors and in combination with the organic photoconductive donor materials form donor-acceptor complexes.

SUMMARY OF THE INVENTION

In accordance with the present invention a new class of organic photoconductors is provided which is formed from a monomer having the following formula:

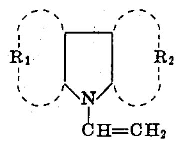

in which $R_1$ and $R_2$ are fused arenic ring structures having from four to 12 carbon atoms and at least one of said ring structures contains at least eight carbon atoms; and said monomer formula is the base unit for forming a polymeric material having the following formula:

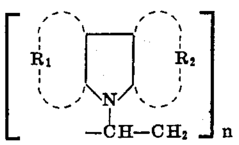

in which $R_1$ and $R_2$ are fused arenic ring structures having from four to 12 carbon atoms and at least one of said ring structures contains at least eight carbon atoms and where $n$ is an integer greater than 1.

The support on which the photoconductive material is applied may be treated to render it conductive or it can be metal or a metal foil such as aluminum, copper or zinc. The use of a polyester film which has been metallized has given excellent results as a conductive support because it is dimensionally stable and at the same time possesses all of the advantages of a sheet of paper. It is essential that the support have a conductivity in the range of from $10^{-11}$ mhos/cm. to the conductivity of metal.

It is a general object of the present invention to provide an organic photoconductive medium having improved physical and photoresponsive properties comprised of polynuclear heterocyclic organic polymeric materials.

It is a further object of this invention to provide a photoconductive material comprised of a copolymer of a polynuclear photoconductive material and a non-photoconductive monomer.

It is still another object of this invention to provide a new and novel monomeric material which is capable of forming improved polymeric films.

It is a further specific object of this invention to provide a photoconductive member which is formed by dispersing a polynuclear heterocyclic aromatic compound in a non-photoconductive film forming resin binder.

It is a still further specific object to provide an improved photoconductive member having a greater photoresponse by incorporating therein $\pi$-type acid sensitizers with the organic photoconductive donor material, which form a highly soluble donor-acceptor complex.

It is a still another specific object of this invention to provide a photoconductive member which has been sensitized by both chemical and dye sensitizers and whose spectral response extends into the visible range of the spectrum.

DESCRIPTION OF THE INVENTION:

Typical of the polynuclear aromatic photoconductive polymeric compounds useful in the preparation of the photoconductive materials are the following compounds:

| | | |
|---|---|---|
| 1. | 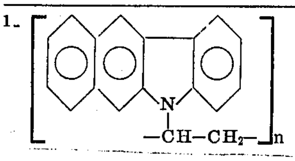 | Poly[N-vinyl-5H-benzo(b) carbazole]. |
| 2. | 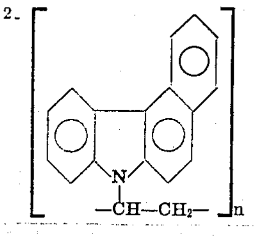 | Poly[N-vinyl-7H-benzo(c) carbazole]. |
| 3. | 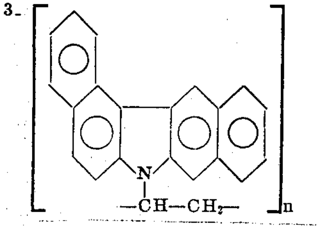 | Poly[N-vinyl-7H-dibenzo(b,g) carbazole]. |
| 4. | 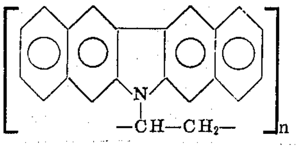 | Poly[N-vinyl-6H-dibenzo(b,h)-carbazole]. |
| 5. | 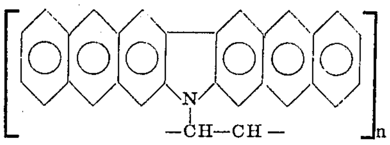 | Poly[N-vinyl-7H-dinaphtho(2,3-b:2',3'-h) carbazole]. |
| 6. | 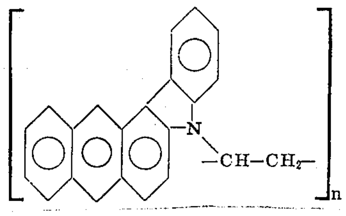 | Poly[N-vinyl-5H-naphtho(2,3-c)carbazole]. |
| 7. | 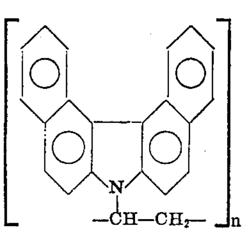 | Poly[N-vinly-7H-dibenzo(c,g)-carbazole]. |

The polymers of the polynuclear aromatic vinyl compounds can be prepared by known polymerization processes, such as bulk, solution, suspension or emulsion polymerization, using as a catalyst known radical forming agents, such as peroxides, azo compounds or ionic catalysts such as, for example, boron trifluoride.

In the bulk polymerization process, the monomer, such as N-vinyl-7H[c]benzocarbazole is reduced to its molten state and the radical forming agent, such as the azo compound, azo-bisdiisobutyronitrile or peroxides such as benzoyl peroxide added, and when polymerization is completed, the product thus obtained is purified by dissolving it in a solvent and precipitating it with a non-solvent. The degree of polymerization is controlled by the reaction conditions such as temperature, the type of solvent and the kind and quantity of catalyst that is employed. The molecular weight does not appear to be particularly critical and successful results have been obtained with materials of low molecular weight as well as high molecular weight.

The preferred molecular weight range has been estimated between 10,000 and 5,000,000 and an indication of the degree of polymerization is obtained by relative viscosity values. Using this measurement, it has been found that polymers which have a relative viscosity value above 1.0 in chlorobenzene provide good film forming properties. Good results are obtained with polymers falling in the relative viscosity range of 1.3 to 5.0. It should be pointed out that while reference has been made to molecular weight values and relative viscosity values, they are intended to be exemplary and not to limit the scope of the invention.

The monomeric polynuclear aromatic compounds are prepared by the treatment of the appropriate aromatic compound, e.g. substituted naphthalene with an appropriate aryl hydrazine in the presence of alkaline bisulfite followed by acid hydrolysis which produces the corresponding arocarbazoles described herein (Beilstein, Organische Chemie, Volume 20, pages 494 and 495).

Preparation of dinaphtho or dibenzo carbazole may be accomplished by reacting 2,2'-diamino dinaphthyl or 2,2'-diamino dianthryl with phosphoric acid or hydrochloric acid to yield the corresponding carbazole, (Chemische Berichte 86, 522-4 (1953). Reaction of 2-nitroso binaphthyl or 2-nitroso bianthryl with a solution of triethyl phosphite in benzene at 0° – 5° C. under $N_2$ will yield the corresponding carbazole, (Proceedings of the Chemical Society, 1962, 78).

The vinyl compounds are prepared by treating, e.g. a benzocarbazole with beta-chloroethyl toluenesulfonate to obtain the corresponding N-β-chloroethylbenzocarbazole and then dehydrohalogenating this to the vinyl compound. (Clemo and Perkin, Journal of the Chemical Society, 1924, page 1804). Alternatively, the arocarbazole can be treated with acetylene to obtain the corresponding N-vinyl compound directly, (Kirk-Othmer Encyclopedia of Chemical Technology, Chapter 11, page 655). Polymerization of N-vinyl arocarbazole monomers may be accomplished by known techniques referred to earlier. The molecular weight of the polymeric material may range from 10,000 to 5,000,000, the preferred range being from 50,000 to 2,000,000.

To prepare the photoconductive members of this invention, the purified polymeric material is dissolved in chlorobenzene and applied to a suitable base support in the form of a uniform continuous layer by conventional coating means, such as a wire wound rod or trailing blade coater, at a rate of 0.5g to 2.0g per square foot, preferably 0.75g to 1.0g to produce a film thickness in the range of 0.1 mil to 0.5 mil, preferably in the range of 0.2 to 0.3 mil, after the evaporation of solvent. In the circumstance that a rather high molecular weight polymeric material is employed it will survive as the photoconductive film without the aid of any additional resins or copolymers.

It will be appreciated that while the polymeric compounds of this invention may form a continuous film when applied to the base support, it may be desirable to include a resin binder in order to improve abrasion resistance, flexibility, and other mechanical properties. It is therefore contemplated that resin binders may be added to the polymeric material to impart certain characteristics to the layer, such as abrasion resistance or flexibility. Polymeric material, such as polyvinyl chloride, polyvinyl acetate, polyvinyl ether, polystyrene, chlorinated rubber, alkyd resins, phenolformaldehyde resins, styrene-butadiene copolymers, and polyamide resins may be added. The resin binder may comprise up to 80 percent by weight of the film forming material applied to the base support and preferably should range between 1 and 40 percent by weight.

Another embodiment of the photoconductive materials useful in the practice of this invention is the preparation of copolymers or polyblends formed with the polynuclear aromatic heterocyclic photoconductive monomer and other monomeric materials, such as vinylacetals, vinyl esters such as vinylacetate, alkyl acrylates, methacrylates, styrene, vinyl chloride, alkyl methacrylates, acrylic acid, acrylonitrile, alkyl substituted acrylonitriles, vinyl ethers, and acenaphthene. The copolymers of the polynuclear aromatic heterocyclic vinyl compounds and the non-photoconductive monomeric materials can be prepared by known polymerization processes described above in connection with the polymerization of the N-vinylarocarbazoles. It has been found that certain properties of the photoconductive member, such as its flexibility, or the plasticity of the photoconductive film itself and its abrasion resistance may be enhanced by copolymerization with the monomeric materials above recited. In the preparation of the copolymer the non-photoconductive monomeric material should not exceed 80 percent by weight of the photoconductive polynuclear monomer which is employed.

The photosensitivity of the photoconductive materials prepared by the foregoing general techniques is found to be in the ultraviolet portions of the spectrum. It is generally desirable in this art to extend the photosensitivity of the materials to the visible range of the spectrum in order to make possible the use of ordinary tungsten-type filament sources which emit radiation from the ultraviolet to the near infrared which may range from 360 millimicrons to 725 millimicrons in wavelength. The extension of the photosensitivity is known to be accomplished by the addition of small amounts of sensitizers which may be π-type acids or the dye sensitizers of the type disclosed in U.S. Pat. No. 3,052,540.

The π-type acids are known to be electron acceptors and when combined with the photoconductive donor materials form donor-acceptor complexes.

A list of the π-type acids which may be used is provided below. The list is by no means intended to be exhaustive and is merely exemplary of the type of materials that may be used.

The amount of sensitizer to be added to the photoconductive material may range from 0.01 mol percent to 20 mol percent calculated on the basis of moles of sensitizer per 100 moles of photoconductor present in the formulation. The molecular weight of the polymeric material is taken as the weight of the monomer for the purpose of this calculation. The amount of sensitizer to be added may optionally be determined on a weight basis taking the amount of sensitizer as a percentage based on the weight of photoconductive material that is present in the formulation.

In the instant invention the use of the polymeric polynuclear material has given surprising results in terms of their ability to form highly soluble donor-acceptor complexes in the circumstance that high concentrations of sensitizer are employed such as up to 20 mole percent, which can represent weight concentrations in the range of 30 to 40 percent based on the weight of the photoconductor. Understandably, in preparing a coating formulation, it is highly desirable that all the ingredients remain in solution and that the final film be free of any crystal formations which clearly would interfere with the reproducing properties of the photoconductive layer.

The degree of solubility of the donor-acceptor complexes is somewhat influenced by the type of solvent employed. It has been found that a wide range of solvents may be used and the results optimized by matching the solvent system to the type of donor-acceptor complex involved. A partial list of solvents is presented below intended to be representative of suitable materials but it is not intended to limit the invention to this group: acetone, acetyl acetone, acetyl chloride, amyl acetate, amyl formate, benzaldehyde, butyl acetate, butyl bromide, butyl methacrylate, butyl cellosolve, butyl stearate, butyrolactone, cellosolve, cyclohexanone, diacetone alcohol, butyl ether, diethyl ether, dimethylether, dioxane-1,4, ethylbenzoate, ethyl chloride, ethylene oxide, furan, hexanediol, methyl cellosolve, propyl acetate, propyl benzene, tetrahydrofuran. The preferred solvents are tetrahydrofuran, dioxane-1,4 and cyclohexanone.

Hence, the use of the materials of the instant invention is particularly desirable in the preparation of photoconductive members for the reason that large amounts of sensitizer may be incorporated therein and their photoresponse correspondingly increased.

CHEMICAL SENSITIZERS a. Anhydrides:
  1. Tetrachlorophthalic anhydride
  2. Naphthalene-1,4,5,8-tetracarboxylic acid dianhydride
b. Cyanocarbons:
  1. Tetracyanoethylene
  2. 7,7,8,8-tetracyanoquinodimethane
c. Quinones:
  1. Chloranil 2. 2,3-dichlorodicyano-1,4-benzoquinone
3. Phenanthrenequinone d. Nitroaromatics:
1. 1,3,5-trinitrobenzene
2. Picric acid
3. 2,4,7-trinitrofluorenone e. Oxazolone and butenolide derivatives of fluorenone:
1. 2-(o-acetoxyphenyl)-4(2,4,7-trinitro-9-fluorenylidene)-5-oxazolone
2. 2-phenyl-4 (2,4,7-trinitro-9-fluorenylidene)-5-Oxazoline
3. α-(2,7-dinitro-9-fluorenylidene)-γ-phenyl-Δβ,γ-butenolide
4. 2-o-iodo-phenyl-4(2,4,7-trinitro-9-fluorenylidene)-5-oxazolone f. Fluorenes and derivatives thereof:
1. 2,7-dinitrofluorenone
2. 9-(dicyanomethylene)-2,7-dinitrofluorene
3. 9-(dicyanomethylene)-2,4,7-trinitrofluorene The useful sensitizers that may be utilized for forming donor-acceptor complexes is more completely disclosed in U.S. Pat. No. 3,556,785, issued on Jan. 19, 1971, to Evan S. Baltazzi and U.S. Patent application Ser. No. 830,879, filed in the name of Evan S. Baltazzi; both the patent and the application being assigned to the same assignee as the instant invention.

A wide variety of sensitizing dyes may be used to extend the response to include the visible range of the spectrum, such as disclosed in U.S. Pat. No. 3,052,540, which list includes the following:

I. Xanthene Dyes:
Fluorescein
Eosine
Phloxine
Phloxine B
Erythrosine
Rose Bengal II. Triarylmethane Dyes:
Malachite Green
Crystal Violet
Basic Fuchsine
Methyl Green
Brilliant Green
Patent Blue
Brilliant Blue FCF III. Thiazole Dyes:
Thioflavine TG IV. Thiazine Dyes:
Methylene Green
Methylene Blue V. Azine Dyes:
Neutral Red
Safranine Y
Methylene Violet VI. Acridine Dyes:
Acridine Orange VII. Diphenylmethane Dyes:
Auramine O VIII. Cyanine Dyes:
Ethyl Red Kryptocyanine
(Absorption Max. in alcohol 5602 A.) (1,1'-diethyl-4,4'-carbocyanine iodide.)
Pinacyanol
Thiazole Purple
(3,3'-diethylthia carbocyanine iodide.)

IX. Mixture of Dyes:
Methylene Grey

X. Anthraquinone Dyes:
Alizarine Red
Quinizarin
Carbanthrene Yellow G (Flavanthrone)

The process of making a reproduction utilizing the photoelectrostatic members of this invention involves applying a sensitizing electrostatic charge to the photoconductive layer in the range of 400 volts to 2000 volts by means of a corona discharge electrode which is connected to a high potential source of from 4000 to 7000 volts. The materials may be charged either positively or negatively. The charged layer, upon receiving an electrostatic charge in the dark, becomes sensitive to electromagnetic radiation and is then exposed to a pattern of light and shadow by directing the radiation through a light transmitting original which is placed in contact over the photoconductive layer or by illuminating a graphic original with suitable radiation and then projecting the reflected pattern through a lens system onto the photoconductive member.

Exposing the photoconductive layer to a pattern of light and shadow produces a corresponding electrostatic image with a charged area corresponding to the shadow portions and in the light struck areas the charge is dissipated through the conductive support.

A charge image is rendered visible by the application of a suitable toner which adheres to the image portions. Positively oriented toners are generally employed where the sensitizing charge is negative and reversal orienting toners are used for positively charged members, both systems producing a positive print from a positive original. The makeup of these toners is well known in the art and need not be further described here.

The material image is then fixed directly on the member or it may be transferred under controlled conditions to a receiving sheet, such as plain paper, and then fixed. The material image may be fixed by exposing the toner to a source of heat which causes the material to coalesce and fuse to the support. In the circumstance that the toners are pressure responsive, they can be fixed by pressure, such as passing the members between a set of pressure rollers.

Paper base materials provided with a continuous thin film of uniform thickness of the photoconductive substances according to the present invention were eminently successful as photoelectrostatic members which became the final copy upon the fixing of the powder image thereon. The application of the photoconductive materials to metallized films gave excellent results as a reusable photoconductive medium suitable in a reproduction process, such as described in U.S. Pat. 3,627,523, granted Dec. 14, 1971 in the name of Loren E. Shelffo and assigned to the same assignee.

In the circumstance that transparent supports are used the photoelectrostatic members can be used to effect reflex type exposures in which a two-sided graphic original is exposed directing the radiation through the photoelectrostatic member to impinge upon the graphic subject matter reflexing a pattern of light and shadow onto the photoconductive layer.

The following examples are presented for illustrating the present invention without limiting the scope thereof.

EXAMPLE I

A photoelectrostatic member was prepared by dissolving 5 grams of poly[N-vinyl 7H-benzo(c)carbazole] in 65 grams of chlorobenzene. The solution was then applied to a suitable support material, such as aluminized mylar of 1 mil thickness, using conventional coating equipment, such as a meniscus coater or a trailing blade coater. The solution was applied at a rate sufficient to produce a photoconductive layer of about 0.2 to 0.3 mil in thickness after the evaporation of the solvent. Evaporation of the chlorobenzene from the solution is accomplished by passing the coated web through a forced hot air oven maintained between 90° C. and 135° C.

EXAMPLE II

The photoelectrostatic member of this example was prepared following the formulations of Example I with the exception that poly[N-vinyl 5H-benzo(b)carbazole] was substituted for the poly[N-vinyl 7H-benzo(c)carbazole] and the polymer solution was applied at a rate sufficient to produce a photoconductive layer of 0.5 mil in thickness after the evaporation of the solvent.

EXAMPLE III

The formulation of this example follows the preparation of Example I with the exception that poly[N-vinyl 7H-dibenzo(b,g)carbazole] was substituted for the [N-vinyl 7H-benzo(c)carbazole].

EXAMPLE IV

A paper base photoelectrostatic member was prepared by dissolving five grams of poly[N-vinyl 7H-benzo(c)carbazole] in 65 grams of chlorobenzene. The solution was then applied to a paper base support having a conductivity of $10^{-11}$ mhos per centimeter, a caliper of 2.4 mils. The coating solution was applied at a rate sufficient to produce a photoconductive layer of one gram per square foot of base and a thickness of 0.3 to 0.4 mil.

EXAMPLE V

The photoelectrostatic member of this example was prepared following the procedures set forth in Example I and additionally there was added a .005 grams of a π-type sensitizer representing 0.1 percent by weight of the weight of polymer solids in the solution. This amount of sensitizer also represents .09 mol percent of sensitizer 2,5-dinitrofluorenone based on the moles of the photoconductor included in the formula.

EXAMPLE VI

The photoelectrostatic member of this example followed the preparation of Example V with the exception that a dye sensitizer was added in place of the π-acid type sensitizer in an amount equal to 0.5% by weight of the polymer present as solid material. The dye was a mixture of equal parts by weight of Rose Bengal, Color Index 45440, and Fluorescein, Color Index 45350.

EXAMPLE VII

The photoelectrostatic member of this example was prepared by dissolving 3 grams of poly[N-vinyl 7H-dibenzo(b,g)carbazole] and 3 grams of poly[N-vinyl 5H-benzo(b)carbazole] in 65 grams of chlorobenzene. To the solution was added .006 grams of a π acid type sensitizer 9(dicyanomethylene)-2,7-dinitrofluorene (molecular weight 318) which represented 1 percent by weight of the weight of polymer as a dry solid. Expressed in mole percent, this represents .0845 mol percent of the sensitizer based on the moles of photoconductor used (as determined from the molecular weight of the monomers). The π acid sensitizer was first dissolved in 35 grams of methylene chloride. The final solution was applied to an aluminized Mylar base support having a thickness of 5 mils and at a rate sufficient to produce a photoconductive layer of 1 gram per square foot having a final dry coating thickness of 0.3 to 0.4 mils.

EXAMPLE VIII

The photoconductive member of this example was prepared by dissolving 30 grams of a copolymerized polynuclear organic photoconductive material prepared by polymerizing 2 moles of vinyl-7H-dibenzo(b,g)carbazole monomer with one mole of stearyl methacrylate monomer, in 65 grams of chlorobenzene. To the solution was added 0.3 grams of a π-type acid 2,4,7-trinitrofluorenone which represents 1 percent by weight of the copolymerized solids and 0.014 mole percent of the sensitizer per mole of the photoconductive material. The solution was applied to an aluminized Mylar film at a rate sufficient to lay down a coating weight of 2 grams per square foot of the base support having a coating thickness of 1 mil on a dry basis.

EXAMPLE IX

A photoelectrostatic member was prepared by dissolving 6 grams of poly[N-vinyl 7H-dibenzo(b,g)carbazole] and 24 grams of styrene butadiene sold by Goodyear under its trademark PLIOLITE 730. The solution was applied to a conductive paper base of 3 mils thickness at a rate sufficient to lay down a coating weight of 1.5 grams per square foot which produced a coating thickness of 0.5 to 0.6 mils.

EXAMPLE X

The photoelectrostatic member of this example was prepared following the formulation of Example I and Example V with the exception that poly[N-vinyl 7H-dibenzo(b,g)carbazole] was substituted for the poly[N-vinyl 7H-benzo(c)carbazole].

EXAMPLE XI

The photoelectrostatic member of this example was prepared following the formulations of Examples I and V with the exception that poly[N-6H-dibenzo(b,h)carbazole] was substituted for the poly[N-vinyl 5H-benzo(b)carbazole].

EXAMPLE XII

The photoelectrostatic member of this example was prepared following the formulation of Examples I and V with the exception that poly[N-vinyl 7H-dinaphtho(2,3-b:2',3'-h)carbazole] was substituted for the poly[N-vinyl 5H-benzo(b)carbazole].

EXAMPLE XIII

The photoelectrostatic member of this example was prepared following the formulation of Examples I and V with the exception that poly[n-vinyl 5H-naphtha(2,3-c)carbazole] was substituted for the poly[N-vinyl 5H-benzo(b)carbazole].

EXAMPLE XIV

The photoelectrostatic member of this example was prepared following the formulation of Examples I and V with the exception that poly[N-vinyl 7H-dibenzo(c,g)carbazole] was substituted for poly[N-vinyl 5H-benzo(b)carbazole].

EXAMPLE XV

The photoelectrostatic member of this example was prepared following the procedure of Example I with the exception that a π acid-type sensitizer 2,7-dinitrofluorenone, having a molecular weight of 270, was added in an amount of 0.56 grams which represents a 10 mole percent calculated on the basis of moles of sensitizer per 100 moles of the photoconductor using the molecular weight of the monomer. On a weight percent basis, the sensitizer constitutes 11% by weight of the total weight of photoconductor present. The sensitizer was first dissolved in about 100 cc. of a solvent mixture comprising equal amounts of dioxane-1,4 and cyclohexanone. The solution was added to the 65 grams of the chlorobenzene solution containing the poly[N-vinyl 7H-benzo(c)carbazole]. The polymer-sensitizer solution was then applied to a suitable base support at a rate sufficient to produce a photoconductive layer having a thickness on a dry basis of 0.5 mils.

EXAMPLE XVI

The photoconductive member prepared in this example follows the preparation of Example XV with the exception that the concentration of the sensitizer was increased to 20 mole percent by the addition of 1.12 grams of 2,7-dinitrofluorenone. Coating thickness on a dry basis was about 0.50 mils.

EXAMPLE XVII

The photoconductive member of this example was prepared by dissolving 5 grams of poly[N-vinyl 7H-benzo(c)carbazole] in 66 grams of cyclohexanone and 29 grams of tetrahydrofuran to which was added .65 grams of 9(dicyanomethylene)-2,7-dinitrofluorene (molecular weight 318). The mole percent of sensitizer added represents 10 mole percent based on a molecular weight of the monomeric photoconductor taken as 243. On a weight basis, the amount of sensitizer used was 13 percent.

The photoconductive material and sensitizer were stirred at room temperature until all of the ingredients were dissolved.

The application of the coating solution to the base of aluminized Mylar proceeded without any change in the solubility of the ingredients and resulted in a uniform film applied over the conductive base support. The coating thickness on a dry basis was about 0.5 mils.

EXAMPLE XVIII

Five grams of poly[N-vinyl 7H-benzo(c) carbazole] was dissolved in 66 grams of cyclohexanone and 29 grams of tetrahydrofuran. To the solution was added the sensitizer 2-acetoxy phenyl-4(2,4,7-trinitro-9-fluorenylidene)-5-oxazolone (molecular weight 516) in an amount of 2.13 grams. This amount represents 20 percent of sensitizer present in the formulation based on moles of sensitizer per 100 moles of organic photoconductor present taking the molecular weight of the photoconductor as a monomer. On a weight basis, the amount of sensitizer represents 42 percent by weight of the amount of photoconductor.

The ingredients were brought into solution by stirring and then applied to a suitable base support. The ingredients remained in solution during the application process and the coating of the finished photoconductive member was uniform without the formation of crystals or irregularities indicating that all the ingredients were completely in solution.

The coating thickness was about 0.5 mils.

EXAMPLE XIX

The photoconductive member of this example follows the procedure described in Example XVII with the exception that the amount of sensitizer 9(dicyanomethylene)-2,7-dinitrofluorene added was 1.3 grams. This amount represents a sensitizer content of 20 mole percent based on 100 moles of the photoconductor using the molecular weight of the monomeric material. In all respects, the solubility of the coating solution of the instant invention and the uniformity of the photoconductive film formed on the conductive layer was uniform and did not exhibit any presence of materials tending to come out of solution of the formation of any precipitates. The coating thickness on a dry basis was 0.5 mils.

EXAMPLE XX

Five grams of poly[N-vinyl 6H-dibenzo(b,h)carbazole] (molecular weight 295) was dissolved in 66 grams of cyclohexanone and 29 grams tetrahydrofuran. To the solution was added 1.5 grams of the sensitizer 2-acetoxyphenyl-4(2,4,7-trinito-9-fluorenylidene)-5-oxazolone (molecular weight 516). The amount of sensitizer represented 17 mole percent based on the moles of donor taken as the molecular weight of the monomer. On a weight percent basis 30 percent sensitizer was used. The coating formulation was applied using the techniques described in Example I. The coating thickness of the dried layer was about 0.50 mils.

The photoelectrostatic members of Examples I through IV were charged to a saturation voltage level of about 1000 volts with a corona discharge electrode and then exposed to the actinic radiation from a tungsten source (i.e. radiation in the range of 360 to 400 millimicrons.) The sensitivity of the member was recorded as about 50 volts per foot candle second. The photoelectrostatic members of Examples V through IX, which were sensitized, were exposed to a tungsten filament lamp emitting radiation over the range of 360 millimicrons to 725 millimicrons and recorded a sensitivity in the range of 60 to 70 volts per foot candle second.

In all cases, a developed image was of high contrast and of good image density.

The Examples X through XIV exhibited a photoresponse which was similar to the results obtained in Examples V through IX.

Examples XV through XIX, in which the percentage of the sensitizer was greatly increased over the concentration of sensitizer in examples V through IX resulted in increased sensitivity in the range of 100 to 150 volts per foot candle second representing a 300 percent increase in the sensitivity over the photoconductive members which had no sensitizer added and a 50 to 100 percent increase in the sensitivity of the examples in which concentrations of sensitizer were less than 5% by weight or mole percent.

In all of the examples set forth herein the photoresponse of the photoconductive members is comparable because the amount and kind of photoconductive material employed were the same. Where the molecular weight of the photoconductive material varies, it may be desirable to adjust the rate of application so that the amount of photoconductor per unit area is controlled in those instances where comparable levels of donor are desirable for comparison purposes, such as Example XX. Accordingly, where the effect of the sensitizer is to be compared, the amount of coating applied is adjusted to provide approximately the same molar concentration of donor per unit area.

The monomeric material in the form of N-vinyl 7H-benzo(c) carbazole was found to form excellent films when the monomer was polymerized and dissolved in a suitable solvent. The films are found to be particularly tough capable of enduring considerable flexural stress, such as must be endured by a photoconductive member which is repeatedly used in a duplicating process. The physical property of the polymeric film being able to resist extensive flexural stress is independent of its photoconductive property and is deemed to be a significant advancement in the area of film forming polymeric materials.

The class of polynuclear organic photoconductive materials described herein produce photoconductive media which are reusable produce high quality images, and improve generally the transferability of the toner images from the photoconductive layer to plain paper and exhibit greater sensitivity than prior art materials when treated with $\pi$-type sensitizers and dye sensitizers for the reason of the greater solubility of the donor-acceptor complexes.

It will be obvious to those skilled in the art that many modifications may be made within the scope of the present invention without departing from the spirit thereof.

What is claimed is:

1. A photoelectrostatic member comprising a conductive base support coated with a uniform continuous photoconductive film comprising an organic photoconductive polymer of the donor type have the formula:

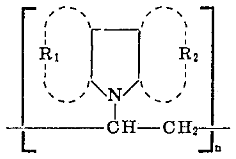

in which $R_1$ and $R_2$ are fused condensed arenic ring structures having from four to 12 carbon atoms, at least one of said ring structures containing at least eight carbon atoms, *n* is an integer greater than 1, and wherein $R_1$ and $R_2$ may be the same or different and including therein at least 5 mole percent of a $\pi$ acid-type sensitizer based on the moles of the organic photoconductor polymer taken as the molecular weight of the monomer comprising said polymer.

2. A photoelectrostatic member as claimed in claim 1 in which the photoconductive polymer is poly[N-vinyl 5H-benzo(b)carbazole].

3. A photoelectrostatic member as claimed in claim 1 in which the polymer is poly[N-vinyl 7H-benzo(c)carbazole].

4. A photoelectrostatic member as claimed in claim 1 in which the polymer is poly[N-vinyl 7H-dibenzo(b,g)carbazole].

5. A photographic reproduction process which comprises exposing an electrically charged, photoconductive insulating layer carried on a conductive base support to a pattern of light and shadow and developing the resulting charge image with a developer material, the photoconductive layer comprising a compound having the formula:

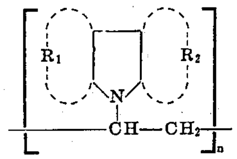

in which $R_1$ and $R_2$ are fused condensed arenic ring structures having from four to 12 carbon atoms, at least one of said ring structures containing at least 8 carbon atoms, *n* is an integer greater than 1 and wherein $R_1$ and $R_2$ may be the same or different and including therein at least 5 mole percent of a $\pi$ acid-type sensitizer based on the moles of the organic photoconductor polymer taken as the molecular weight of thp monomer comprising said polymer.

6. The photographic reproduction process as set forth in claim 5 in which the photoconductive polymer is poly[N-vinyl 5H-benzo(b)carbazole].

7. The photographic reproduction process as set forth in claim 5 in which the polymer is poly[N-vinyl 7H-benzo(c)carbazole].

8. The photographic reproduction process as set forth in claim 5 in which the polymer is poly[N-vinyl 7H-dibenzo(b,g)carbazole].

9. A photoelectrostatic member comprising a conductive base support coated with a uniform continuous film comprising an organic photoconductive copolymer formed of a photoconductive donor material having the formula:

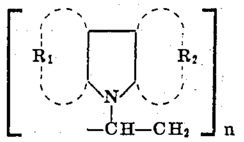

in which $R_1$ and $R_2$ are fused condensed arenic ring structures having from four to 12 carbon atoms, at least one of said ring structures containing at least 8 carbon atoms, wherein $R_1$ and $R_2$ may be the same or different and including therein at least 5 mole percent of a $\pi$ acid-type sensitizer based on the moles of the organic photoconductor polymer taken as the molecular weight of the monomer comprising said polymer, and a monomer selected from the group consisting of vinyl acetals, vinyl acetate, alkyl acrylates, methacrylates, styrene, vinyl chloride, alkyl methacrylates, acrylic acid, acrylonitrile, alkyl substituted acrylonitriles, vinyl ethers and acenaphthene.

10. The photoelectrostatic member as claimed in claim 9 in which the photoconductive monomer is N-vinyl-5H-benzo(b)carbazole.

11. The photoelectrostatic member as claimed in claim 9 in which the photoconductive monomer is N-vinyl-7H-benzo(c)carbazole.

12. The photoelectrostatic member as claimed in claim 9 in which the photoconductive monomer is N-vinyl-7H-dibenzo(b,g)carbazole.

13. A photoelectrostatic member comprising a conductive base support coated with a uniform, continuous photoconductive film comprising an organic photoconductive donor polymer having the formula:

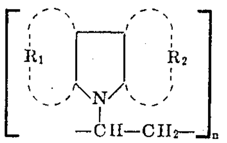

in which $R_1$ and $R_2$ are fused condensed arenic ring structures having from four to 12 carbon atoms, at least one of said ring structures containing at least 8 carbon atoms, $n$ is an integer greater than 1, wherein $R_1$ and $R_2$ may be the same or different said photoconductive film having included therein at least 5 mole percent of a $\pi$ acid-type sensitizer based on the moles of the organic photoconductor polymer taken as the molecular weight of the monomer comprising said polymer, said polymer and acid-type sensitizer being dispersed in an organic resin binder and wherein said photoconductive polymer comprises at least 20 percent by weight of the dry film.

14. A photoelectrostatic copying process as set forth in claim 6 in which the photoconductive polymer is poly[N-vinyl6H-dibenzo(c,h)carbazole].

15. A photoelectrostatic copying process as set forth in claim 6 in which the photoconductive polymer is poly[N-vinyl7H-dibenzo(c,g)carbazole].

16. A photoelectrostatic member comprising a conductive base support coated with a uniform continuous photoconductive film comprising an organic photoconductive polymer of the donor type, having the formula:

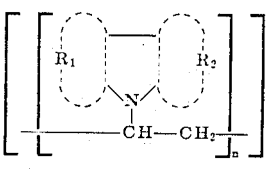

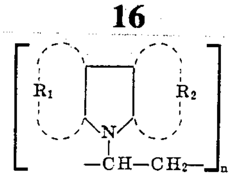

in which $R_1$ and $R_2$ are fused condensed arenic ring structures, having four, eight or 12 carbon atoms, at least one of said ring structures containing at least eight carbon atoms, and $n$ is an integer greater than 1, and wherein $R_1$ and $R_2$ may be the same or different and including therein a $\pi$ acid sensitizer selected from the group consisting of 9-(dicyanomethylene)-2,7-dinitrofluorenone, 2-(0-acetoxyphenyl)-4(2,4,7-trinitro-9-fluorenylidene)-5-oxazolone and 2,7-dinitrofluorenone.

17. The photoelectrostatic member as claimed in claim 16 wherein the amount of said sensitizer is in the range of from 5 mole % to 20 mole % based on the moles of the organic photoconductive polymer taken as an molecular weight of the monomer comprising said polymer.

18. A photographic reproduction process which comprises exposing an electrically charged, photoconductive insulating layer carried on a conductive base support with pattern of light and shadow and developing the resulting charge image with a developer material, said photoconductive layer comprising a compound having the formula:

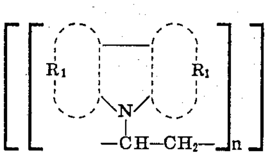

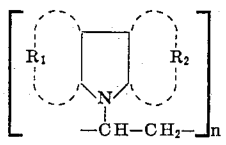

in which $R_1$ and $R_2$ are fused condensed arenic ring structures having 4, 8 or 12 carbon atoms, at least one of said ring structures containing at least 8 carbon atoms, and $n$ is an integer greater than 1 and wherein $R_1$ and $R_2$ may be the same or different, and including therein a $\pi$ acid-type sensitizer selected from the group consisting of 9-(dicyanomethaline)-2,7-dinitrofluorene, 2-(2-acetoxyphenyl-4) 2,4,7-trinitro-9-fluorenylidene)-5-oxazolone and 2,7-dinitrofluorenone.

19. The photographic reproduction process as claimed in claim 18; wherein said sensitizer is present in an amount ranging from 5 mole percent to 20 mole percent based on the moles of the organic photoconductive polymer taken as the molecular weight of the monomer comprising said polymer.

* * * * *

UNITED STATES PATENT OFFICE
CERTIFICATE OF CORRECTION

Patent No. 3,751,246 Dated August 7, 1973

Inventor(s) Helen C. Printy and Evan S. Baltazzi

It is certified that error appears in the above-identified patent and that said Letters Patent are hereby corrected as shown below:

Column 3, formula 5, should read as follows:

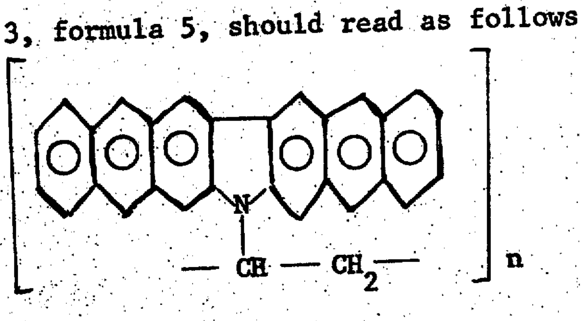

Column 14, line 41, should read as follows:

the monomer comprising said polymer.

Column 14, formula at the bottom of the page should read as follows:

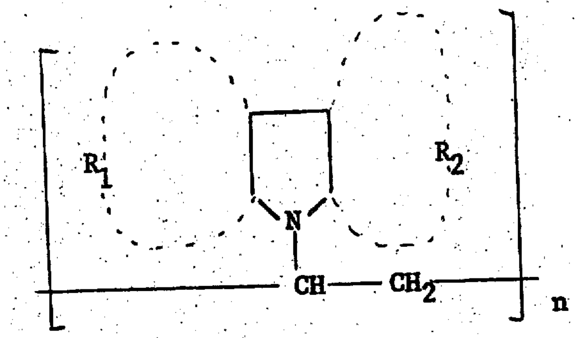

UNITED STATES PATENT OFFICE
CERTIFICATE OF CORRECTION

Patent No. 3,751,246 Dated August 7, 1973

Inventor(s) Helen C. Printy and Evan S. Baltazzi

It is certified that error appears in the above-identified patent and that said Letters Patent are hereby corrected as shown below:

Column 15, line 30, the formula of Claim 13 should read as follows:

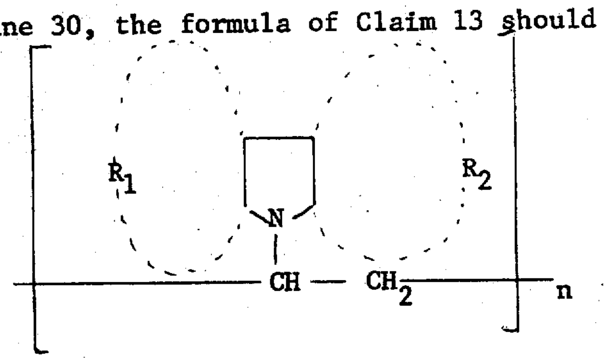

Column 15, line 40, should read as follows:

may be the same or different, said photoconductive film

Column 15, lines 49 to 54, should read as follows:

14. A photographic reproduction process as set forth in claim 5 in which the photoconductive polymer is poly[ N-vinyl-6H-dibenzo(c,h)carbazole ] .

15. A photographic reproduction process as set forth in claim 5 in which the photoconductive polymer is poly [ N-vinyl-7H-dibenzo(c,g)carbazole] .

Column 15, lines 60 to 65, --- delete.

UNITED STATES PATENT OFFICE
CERTIFICATE OF CORRECTION

Patent No. 3,751,246 Dated August 7, 1973

Inventor(s) Helen C. Printy and Evan S. Baltazzi

It is certified that error appears in the above-identified patent and that said Letters Patent are hereby corrected as shown below:

Column 16, lines 1 to 5, the formula should read as follows:

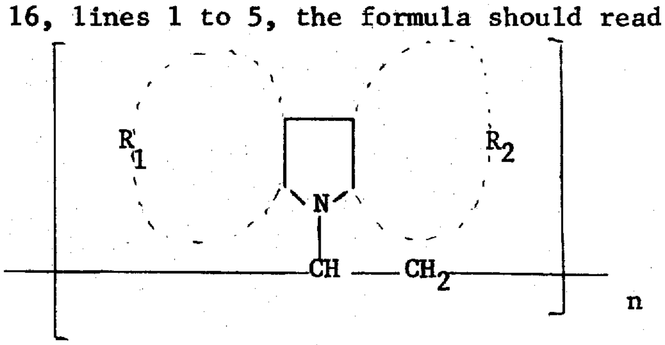

Column 16, line 16, should read as follows:

dinitrofluorene, 2-(2-acetoxyphenyl)-4-(2,4,7-

Column 16, lines 35 to 40, --- delete.

Column 16, lines 41 to 45, the formula should read as follows:

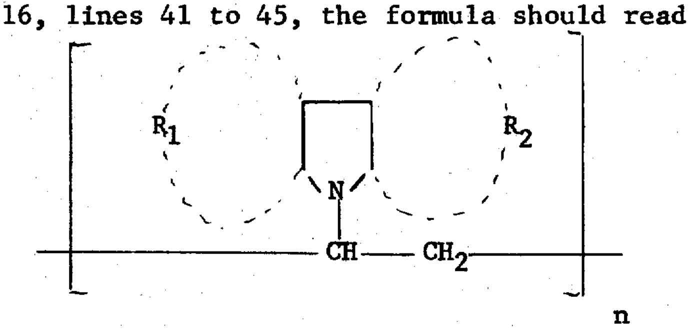

UNITED STATES PATENT OFFICE
CERTIFICATE OF CORRECTION

Patent No. 3,751,246 Dated August 7, 1973

Inventor(s) Helen C. Printy and Evan S. Baltazzi

It is certified that error appears in the above-identified patent and that said Letters Patent are hereby corrected as shown below:

Column 16, line 55, should read as follows:

consisting of 9-(dicyanomethylene)-2,7-

Column 16, line 56, should read as follows:

dinitrofluorene, 2-(2-acetoxyphenyl)-4-(2,4,7-trinitro-

Signed and sealed this 26th day of November 1974.

(SEAL)
Attest:

McCOY M. GIBSON JR.
Attesting Officer

C. MARSHALL DANN
Commissioner of Patents